United States Patent [19]

D'Asaro et al.

[11] Patent Number: 5,298,454
[45] Date of Patent: Mar. 29, 1994

[54] METHOD FOR MAKING SELF-ELECTRO-OPTICAL DEVICE AND DEVICES MADE THEREBY

[75] Inventors: Lucian A. D'Asaro, Madison; Jenn-Ming Kuo, Edison; Shin-Shem Pei, New Providence, all of N.J.

[73] Assignee: AT&T Bell Laboratories, Murray Hill, N.J.

[21] Appl. No.: 969,685

[22] Filed: Oct. 30, 1992

[51] Int. Cl.$^5$ .......................................... H01L 21/203
[52] U.S. Cl. ..................... 437/105; 437/107; 437/126; 437/129; 437/133; 156/610; 372/43; 372/45; 372/99
[58] Field of Search .............. 437/107, 129, 105, 126, 437/133; 156/610, 601; 372/99, 43, 45

[56] References Cited

U.S. PATENT DOCUMENTS 5,034,344 7/1991 Jewell et al. .................... 437/129

OTHER PUBLICATIONS

D. A. B. Miller, "Quantum Well Optoelectronic Switching Devices", *International Journal of High Speed Electronics*, vol. 1, No. 1, pp. 19–46 (1990).
Chirovsky et al., "Batch-Fabricated Symmetric Self-Electro-Optic Effect Devices", *OSA Proceedings on Photonic Switching*, vol. 3, p. 2 (1989).
Pearton, "Ion Implantation for Isolation of III-V Semiconductors", *Materials Science Reports*, vol. 4, p. 315 (1990).
Anholt, et al. "Ion Implantation into Gallium Arsenide", *Journal of Applied Physics*, vol. 64, p. 3429 (1988).
K. Bacher, et al. "Molecular beam epitaxy growth of vertical cavity optical devices with in situ corrections", *Appl. Phys. Lett.* vol. 61, pp. 1387–1389, (1992).
Giugni et al. "New Self electro-optic effect device using two wavelengths in InGaAs/AlGaAs Multiple Quantum Wells" Appl. Phys. Lett. 61(1992), 376–378.
Miller et al. "Novel hybrid optically bistable switch: The Quantum Well Self electro-optic effect device" Appl. Phys. Lett. 45(1984), 13–15.
Fujiwara et al. "Electro-optical bistability in Strained $In_xGa_{1-x}As/Al_{0.15}Ga_{0.85}As$ Multiple Quantum Wells" Appl. Phys. Lett. 57(1990), 2234–2236.

*Primary Examiner*—Olik Chaudhuri
*Assistant Examiner*—Ramamohan Rao Paladugu
*Attorney, Agent, or Firm*—Glen E. Books

[57] ABSTRACT

Applicants have discovered a method of reproducibly fabricating SEED devices having an enhanced contrast ratio by adjusting the thickness of a cap layer in relation to the reflector stacks to form a Fabry-Perot cavity. Specifically, after growth of the reflector stack and the quantum wells, the optical thickness of the region above reflector stacks is measured without breaking vacuum, and based on such measurement a cap layer is grown of sufficient thickness to form a Fabry-Perot cavity for light of desired wavelength. The result is a device with enhanced contrast between the "on" and "off" states sufficiently so that the state can be directly read without differential processing.

7 Claims, 4 Drawing Sheets

METHOD FOR MAKING SELF-ELECTRO-OPTICAL DEVICE AND DEVICES MADE THEREBY

FIELD OF THE INVENTION

This invention relates to optical devices and, in particular, to a method for making an electro-optical device, such as a self-electrooptical device (SEED), which permits fabrication of reproducible Fabry-Perot cavities.

BACKGROUND OF THE INVENTION

Self-electrooptical effect devices offer considerable promise in the field of optoelectronic processing. Because of the low energy requirements of quantum well components, such devices can receive optical inputs and provide optical outputs with a high degree of efficiency. Moreover they can be combined in simple circuits to perform useful functions, such as optical switching, with minimal conductive paths, reduced parasitic capacitance and few line termination problems. For a survey of such devices and their applications, see D. A. B. Miller, "Quantum Well Optoelectronic Switching Devices," International Journal of High Speed Electronics, Vol. 1, No. 1, pp. 19-46 (1990).

A conventional SEED device described in the above-cited Miller article comprises a pair of quantum well PIN diodes tonned on a quantum well reflector stack. The two diodes are connected in series to a voltage source and separate beams of light are shone through the respective diodes to the reflector stacks where the beams are reflected back. The output of either diode can be modulated by vanation in either the optical input to the other diode or by variation in the voltage to the node between the diodes. Thus the device provides both optical input and optical output.

One shortcoming of SEEDs for use in optoelectronic switching is the low contrast ratio in the reflected beam intensity. Even in the "off" condition the device will partially reflect an incident beam, and the contrast ratio between a reflected "off" beam and a reflected "on" beam is typically sufficiently low (approximately 3) that the state of the device must be read by differential techniques. The "on" beam and the "off" beam must be compared in order to determine the condition of the switching device. This differential approach requires twice the laser power and twice the number of signal processing components than would be required for direct reading.

SUMMARY OF THE INVENTION

Applicants have discovered a method of reproducibly fabricating SEED devices having an enhanced contrast ratio by adjusting the thickness of a cap layer in relation to the reflector stacks to form a Fabry-Perot cavity. Specifically, after growth of the reflector stack and the quantum wells, the optical thickness of the region above reflector stacks is measured without breaking vacuum, and based on such measurement a cap layer is grown of sufficient thickness to form a Fabry-Perot cavity for light of desired wavelength. The result is a device with contrast between the "on" and "off" states sufficiently enhanced that the state can be directly read without differential processing.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphs, are not to scale.

DETAILED DESCRIPTION

Figure 1:
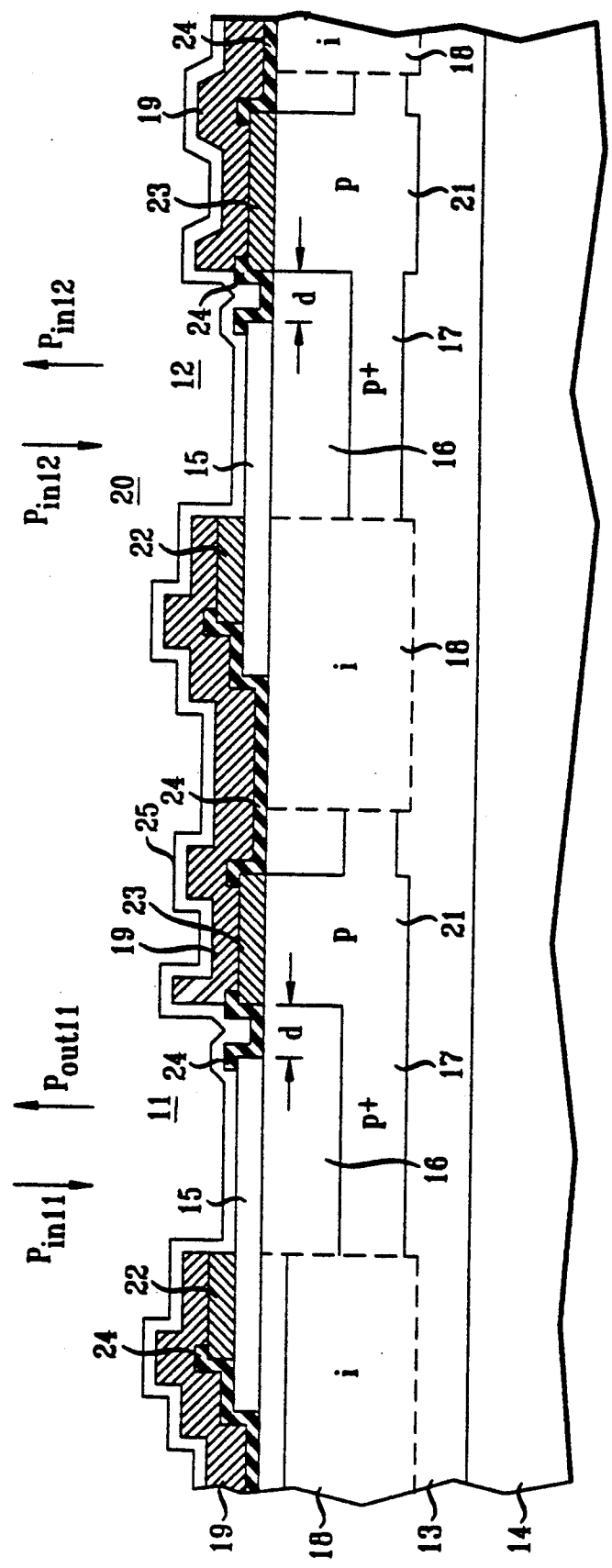
FIG. 1 is a schematic cross section of a preferred SEED device useful in explaining the inventive process/and the problem to which it is directed.

Referring to the drawings, FIG. 1 is a schematic cross section of a preferred SEED device useful in explaining the invention and the problem to which it is directed. In essence, the device of FIG. 1 comprises a pair of quantum well PIN diodes 11 and 12 formed on a reflector stack 13 on a substrate 14. Each PIN diode comprises a cap layer 15 of n-doped semiconducting material, an intrinsic quantum well region 16 and an underlying layer 17 of p-doped semiconducting material.

Contact with the buried Players is via implanted p-regions 21. Since the quantum well regions 16 typically have a thickness in excess of a micrometer, the p-layers 17 are typically buried at least a micrometer from the uppermost continuous semiconductor surface (here the surface under n-layers 15). Preferably, the buried p-layers 17 extend laterally beyond the edge of the respective overlying n-layers 15 so that the contact with the buried player can be laterally displaced from the active region by a distance d exceeding a micrometer. The p+ layers 17 are advantageously terminated and isolated by proton implantation regions 18.

Interconnections between the diodes are effected by metallization layer 19, leaving window openings 20 for providing optical access to each diode. An antireflection coating 25 is advantageously disposed over the upper surface to enhance optical efficiency.

The device of FIG. 1 is typically made of direct bandgap semiconductor using molecular beam epitaxy (MBE). In the preferred embodiment the substrate is gallium arsenide, the buried layer of semiconducting material is p-doped aluminum gallium arsenide, the overlying quantum well region comprises alternating layers of aluminum gallium arsenide and gallium arsenide, and the cap layer is n-doped aluminum gallium arsenide. The reflector stack can be alternate layers of aluminum arsenide and aluminum gallium arsenide as described in Chirovsky et al., "Batch-Fabricated Symmetric Self-Electro-Optic Effect Devices," *OSA Proceedings on Photonic Switching*, Vol. 3, p. 2 (Optical Society of America, 1989).

Figure 2:
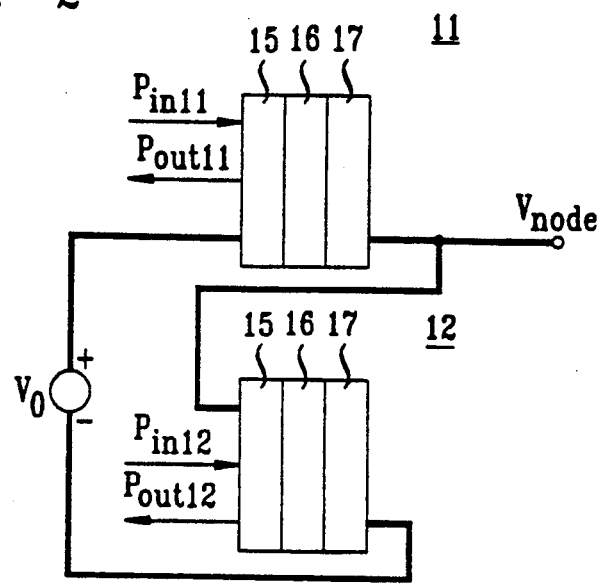
FIG. 2 is a schematic circuit diagram showing the interconnections in a SEED integrated circuit.

In operation, the structure of FIG. 1 can be electrically connected to a voltage source Vo as shown in FIG. 2, and optical input beams P in$_{11}$ and P in$_{12}$ of wavelength λ are applied to diodes 11 and 12, respectively. The reflector stack 13 reflects back respective output beams P out$_{11}$ and P Out$_{12}$. The optical output of either diode can be modulated by varying the optical input to the other diode. Alternatively, the optical output can be modulated by applying a modulating voltage to the node between the two diodes. In a switching device, the switched beam, say P out$_{12}$, is switched between two intensities, a high intensity corresponding to an "on" state and a low intensity corresponding to an "off" state.

In order to maximize the contrast between the "on" state and the "off" state the device of FIG. 1 is ideally fabricated so that the optical path between the top surface and the effective surface of the mirror tonned by stack 13 forms a Fabry-Perot cavity for light of wavelength λ. However, such devices cannot be reproducibly grown using prior techniques. A Fabry-Perot cavity requires control of the thickness to 0.2%. Current MBE technology permits control of thickness to only about 1%. Thus there is too much likely variation (standard deviation) to permit reproducible fabrication of devices, particularly numerous devices in large integrated arrays.

Figure 3:
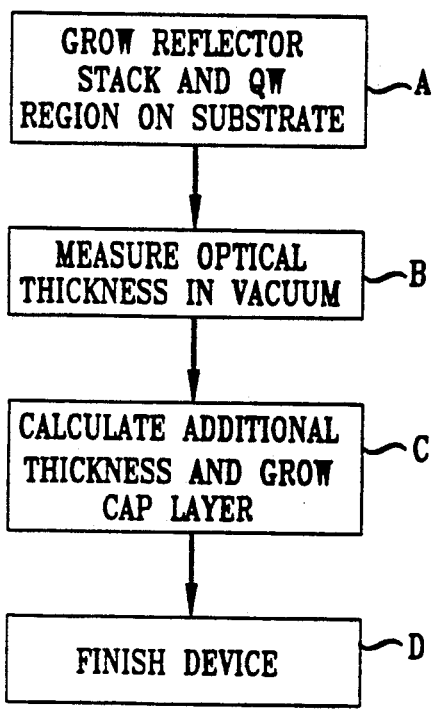
FIG. 3 is a block diagram showing the steps in making a SEED device in accordance with the invention.

FIG. 3 is a block diagram showing the steps in making a seed device in accordance with the invention. The first step shown in 3A is to provide a substrate and grow the reflector stack 13 and the quantum well region 16. This is typically done in an MBE machine with the wafer at elevated temperature and disposed in a low pressure ("vacuum") ambient.

The next step shown in 3B is to measure the optical thickness (nt) of the region above the reflector without breaking vacuum. This measurement is preferably made by transporting the wafer in vacuum from the MBE machine, permitting the wafer to cool, illuminating the wafer with broad band light and measuring the reflected light spectrum. Advantageously the wafer is transferred from the MBE machine to a trolley in a transfer tube in order to permit the wafer to cool without disturbing the ovens of the MBE machine. The wafer is positioned near a window in the transfer tube so that a spectrophotometer beam can be shone upon the wafer and a reflectivity spectrum can be obtained.

Figure 4:
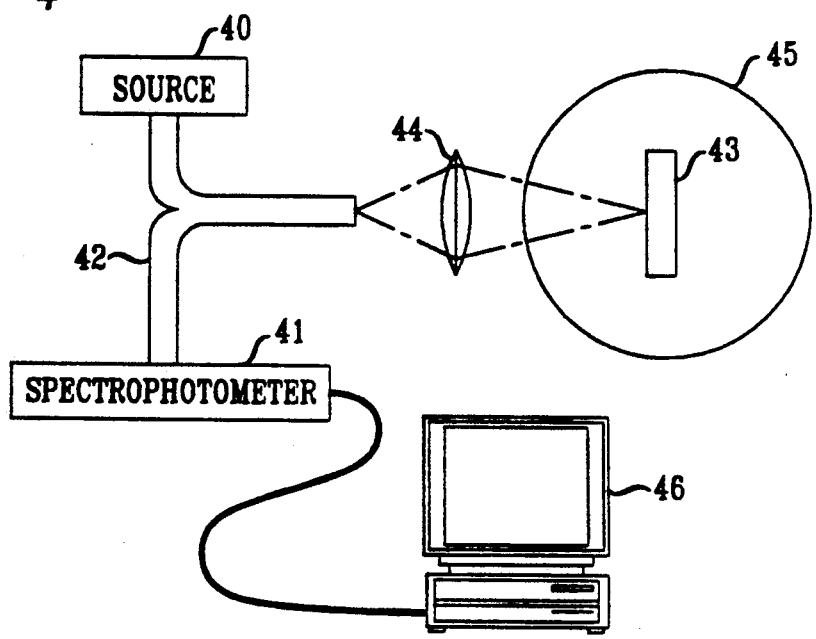
FIG. 4 is a schematic diagram of apparatus useful in practicing the method of FIG. 2.

Preferred apparatus for making this in-situ reflectivity measurement is shown in FIG. 4 to comprise a wide band light source 40 and a spectrophotometer 41 each coupled to a bifurcated light guide 42 for a) directing light from source 40 onto the wafer 43 and b) directing light reflected from wafer 43 to spectrophotometer 41. A lens 44 can be positioned with focal points on the guide and wafer. The wafer is positioned within transfer tube 45 and viewed through a window (not shown). Advantageously light source 40 can be a tungsten-halogen bulb and spectrophotometer 41 can be an Oriel #77200 spectrometer conveniently equipped with an Oriel "Instaspec" diode array detector for interfacing with a personal computer 46 to provide a spectral plot of the reflected light.

Figure 5:
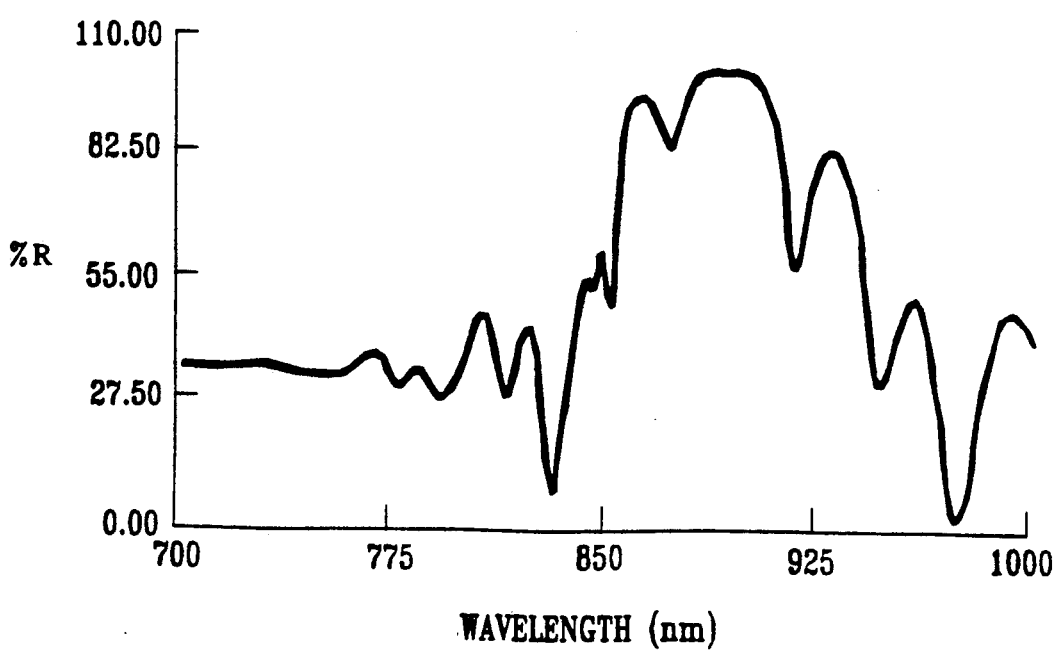
FIG. 5 is a graphical illustration showing the spectrum of light reflected by a typical workpiece.

The optical thickness (nt) and the additional optical thickness Δ(nt) required to produce Fabry-Perot resonance can be calculated from the spectral plot. FIG. 5 is a representative spectral plot of reflection percent (R%) as a function of wavelength. If the optical thickness of the grown layer is nt−Δ(nt), the Fabry-Perot cavity will resonant at a wavelength λ' which is shorter than the designed resonant wavelength λ. The additional optical thickness needed is $\Delta(nt) = m(\lambda - \lambda')/2$.

The next step shown in FIG. 3C is to grow additional material of proper optical thickness to form a Fabry-Perot cavity. This is preferably done by returning the workpiece to the MBE growth chamber, heating the workpiece to growth temperature, and growing a cap layer 15 of n-doped aluminum gallium arsenide of thickness $$t = \frac{\Delta(nt)}{n'},$$

where n' is the optical index of the n-doped material. Refined calculations can also account for loss of GaAs from the surface during processing (less than about 200 Å). It should also be noted that a portion of cap layer 15 can be grown prior to the measuring step of FIG. 3B so that the thickness of the cap 15 is appropriately augmented in step 3C.

The advantage of achieving Fabry-Perot resonance by steps 3B and 3C is that resonance can be achieved even with MBE equipment accurate to 1%. The additional thickness necessary to achieve resonance is at most $$\frac{\lambda}{4n}$$

(about 700 Å for λ=850 nm). A 1% variation for this thin layer is inconsequential. In addition, the n+ cap normally specified for the top of a SEED is 600–1000 Å. Increasing this the cap thickness to 1700 Å is acceptable, since optical absorption for thin n+ layers is not a problem. If the control of the initial layer thickness is accurate to 1% as in a typical MBE process, only about 100 Å additional thickness is needed.

As shown in FIG. 3D, the final step is to finish the device. This can be done in the conventional manner since the cap layer is fully compatible with conventional processing steps.

The fabrication and structure of the invention can be understood in greater detail by consideration of the following specific example. The exemplary structure can be conveniently fabricated by using molecular beam epitaxy (MBE) to grow the layers for the reflector stack and the diodes on a semiconductor substrate. The first step is to provide a substrate 14 of undoped gallium arsenide and to grow the layers for the reflector stack. The reflector sack 13 is preferably grown as plural pairs of AlAs and $Al_xGa_{1-x}$ as layers topped with a relatively thicker layer of $Al_xGa_{1-x}As$. As a specific example, the stack can comprise 15 paired layers of AlAs having thickness 723 angstroms and $Al_{.11}Ga_{.89}As$ having thickness 599 angstroms. The top layer of $Al_{.11}Ga_{.89}As$ is undoped in order to keep dopants from the reflector layers and has thickness of half wavelength, e.g. 1198 angstroms, in order to minimize interaction with light passing through.

The next step is to grow on the reflector stack the layers required for the PIN diodes 11, 12 comprising the buried p-region is preferably grown as a layer of p-doped $Al_xGa_{1-x}As$, and can be a 5000 angstrom layer of $Al_{.11}Ga_{.89}As$ doped with p-impurities to a concentration of $5 \times 10^{18} cm^{-3}$.

The quantum well structure 16 is preferably grown on the p-region as a sandwich structure comprising a buffer layer of $Al_xGa_{1-x}As$, a series of alternating barrier layers ($Al_yGa_{1-y}As$) and well layers (GaAs), followed by an upper buffer layer. In the example, a buffer layer of 500 angstroms of undoped $Al_{.11}Ga_{.89}As$ is grown on the player 17, followed by 71 pairs of 35 angstrom $Al_{.30}Ga_{.70}As$ and 100 angstrom GaAs. The upper buffer is 200 angstroms of undoped $Al_{.11}Ga_{.89}As$ After the growth of the quantum well structure the workpiece is removed from the MBE growth chamber, cooled to room temperature and the opticalthickness above reflecting stack is measured as described in relation to FIG. 3B, above. After measurement, the workpiece is returned to the work chamber and an n+ cap layer, which can be $Al_{.11}Ga_{.89}As$ doped with n impurities to a concentration of $5 \times 10^{18}$, is grown to the thickness required to form a Fabry-Perot cavity as described in connection with FIG. 3C.

The workpiece is then subjected to the desired finishing steps. After the various layers have been grown, the next step is to form isolation regions 18 between successive active regions by proton isolation implant. This is effected by covering the surface with photoresist, photolithographically opening windows over the regions to be isolated, and implanting protons (hydrogen ions) at several implant energies to compensate the acceptors in the buried Player. The implant is followed by a rapid thermal anneal to optimize the isolation. Details of this isolation process are set forth in Pearton, "Ion Implantation for Isolation of Ill-V semiconductors", *Materials Science Reports*, Vol. 4, p. 315 (1990).

The next step is to provide electrical contact regions 21 to the buried p-layer. This is accomplished by ion implantation of p-type impurities. The surface is covered with photoresist, windows are opened over the desired contact regions and p-type impurity such as Be is implanted at several implant energies to assure a conducting path from the surface to the buried layer 17. The Be is annealed by rapid thermal annealing. Details of this process are described in Anholt et al., "Ion Implantation into Gallium Arsenide", *Journal of Applied Physics*, Vol. 64, p. 3429 (1988).

The final steps involve isolating the diodes from one another and forming metal contacts and interconnections. The layer 15 is patterned, as by photolithographic etching, to isolate diodes 11 and 12. N-type Ohmic contacts 22, such as NiGeAu contacts, are made with the n-layer. Similarly p-type ohmic contacts 23 such as Au-Be are made with the player 17 via contact regions 21. Thus both the n-layer and the player are contacted from the same surface. An insulating film 24 such as silicon nitride is deposited and patterned as shown, and a metal interconnect layer 19 such as successive layers of titanium, platinum and gold is deposited over the insulating film in order to connect the diodes in series as shown in FIG. 2.

Figure 6:
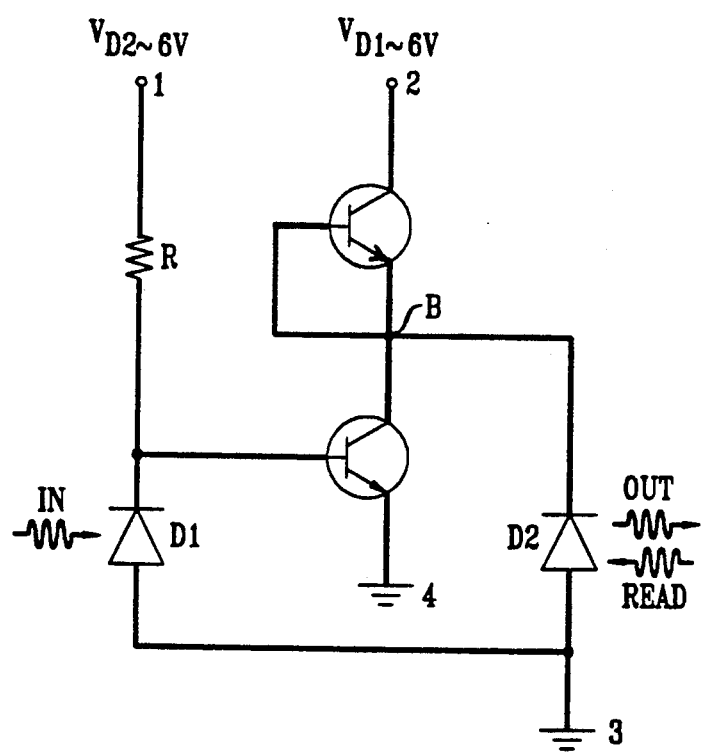
FIG. 6 is a schematic circuit diagram showing a simplified switching arrangement permitted as a result of the enhanced contrast obtained by the invention.

Because this process reproducibly produces SEED devices of enhanced contrast, one can form arrays of high contrast SEED devices for optical memory units with greatly simplified circuitry. An example of such a circuit is shown in FIG. 6. In the FIG. 6 circuit the first SEED diode D1, which acts as the input diode, is serially connected with resistive means R between $V_{D1}$ (9 volts) and ground. The node A between D1 and R is connected to the gate of transistor $T_1$ in a single stage amplifier formed by transistors $T_1$ and $T_2$ so that an input beam IN to $D_1$ effectively turns ON the second SEED diode D2. A READ beam directed onto D2 will be reflected as a high intensity beam corresponding to the ON condition. In the absence of an IN beam to D1, the reflected beam would be low intensity. The contrast ratio between the high and low reflected beams is greater than 10. This circuit uses approximately one-half the number of components of corresponding differential circuitry for performing the same function.

It is to be understood that the above-described embodiments are illustrative of only a few of the many possible specific embodiments of the invention. For example, while the invention has been described in the context of fabricating a SEED device, it is clear that it is useful in the fabrication of other optical devices (such as surface emitting lasers) where quantum well structures are grown over reflecting stacks. Moreover, while the invention has been described in the context of the preferred gallium arsenide materials system, other materials systems such as indium gallium arsenide, indium gallium arsenide phosphide and gallium antimonide can also be used. Thus, numerous and varied other arrangements can be made by those skilled in the art without departing from the spirit and scope of the invention.

We claim:

1. A method for making an electro-optical device of the type comprising a reflector stack, a quantum well region overlying the reflector stack and a cap layer overlying the quantum well region comprising the steps of:

providing a substrate, growing a reflector stack and a quantum well region on the substrate, measuring the optical thickness of the region above the reflector stack, and growing said cap layer above said quantum well region of optical thickness sufficient when combined with said measured optical thickness to form a Fabry-Perot cavity with respect to said reflector stack.

2. The method of claim 1 wherein said electro-optical device is a SEED.

3. The method of claim 1 wherein said electro-optical device is a surface emitting laser.

4. The method of claim 1 wherein said reflector stack and said quantum well region are grown in a reduced pressure growth chamber, at elevated temperature, and said optical thickness is measured at reduced pressure by permitting said substate to cool to room temperature, illuminating the grown structure with broad band light and measuring the reflected light spectrum.

5. A method for making a SEED device having input and output SEED diodes with enhanced contrast ratio, comprising the steps of providing a semiconductor substrate;

growing a reflector stack and a quantum well region on said substrate in a reduced pressure growth chamber at elevated temperature;

removing the resulting structure from said growth chamber and permitting said structure to cool in a reduced pressure ambient;

measuring the optical thickness of said cooled structure in reduced pressure ambient by illuminating said structure with light and measuring the reflected light spectrum;

returning said structure to said growth chamber and growing additional material sufficient to form a Fabry-Perot cavity with respect to said reflector stack.

6. The method of claim 5 wherein:

said semiconductor substrate comprises gallium arsenide;

said reflector stack comprises altrernating layers of aluminum arsenide and aluminum gallum arsenide, said quantum well region comprises one or more gallium arsenide well layers disposed between aluminum gallium arsenide barrier layers; and said additional material comprises a layer of aluminum gallium arsenide doped with n-type impurities.

7. The method of claim 5 wherein said growth chamber is an MBE growth chamber.

* * * * *